United States Patent [19]

Prime et al.

[11] Patent Number: 4,953,730
[45] Date of Patent: Sep. 4, 1990

[54] VAT

[75] Inventors: Martlyn L. Prime, Morphett Vale; Peter F. Warren; Geoffrey D. Johnston, both of McLaren Vale; John C. Babidge, McLaren Vale, all of Australia

[73] Assignee: Stakvat Pty. Ltd., Adelaide, Australia

[21] Appl. No.: 259,325

[22] Filed: Oct. 18, 1988

[51] Int. Cl.⁵ .............................................. B65D 88/10
[52] U.S. Cl. ......................................... 217/4; 217/13; 217/88; 62/371; 220/5 A
[58] Field of Search ................... 62/371, 457.8, 457.4; 217/4, 13, 17, 88, 96, 129; 220/5 A, 5 R, 466

[56] References Cited

U.S. PATENT DOCUMENTS

| | | | |
|---|---|---|---|
| 1,714,633 | 5/1929 | Scarlett | 217/17 |
| 1,916,958 | 7/1953 | Brooks | 217/4 |
| 2,534,188 | 12/1950 | Weber, Jr. | 217/4 |
| 4,484,688 | 11/1984 | Smith | 217/96 |
| 4,703,866 | 11/1987 | Scott | 217/96 |

FOREIGN PATENT DOCUMENTS

| | | | |
|---|---|---|---|
| 535952 | 10/1981 | Australia. | |
| 0246745 | 10/1911 | Fed. Rep. of Germany | 217/4 |
| 1160779 | 1/1964 | Fed. Rep. of Germany | 217/17 |
| 0476904 | 12/1937 | United Kingdom | 217/4 |
| 2181403 | 4/1987 | United Kingdom. | |

*Primary Examiner*—Jimmy G. Foster
*Attorney, Agent, or Firm*—McAulay Fisher Nissen & Goldberg

[57] ABSTRACT

A vat for the storage of wines and other liquids, the vat having a peripheral frame of metal forming the top, bottom and end walls. The side walls are formed of staves of timber in a frame, each side wall being clamped by its frame to a peripheral flange on the peripheral frame of the metal.

20 Claims, 1 Drawing Sheet

VAT

This invention relates to a vat, more particularly a vat or container for the storage of primarily wine and/or other such liquids.

It is known that oak casks are used for the storage of wine, this being desirable for the oak can impart certain flavour characteristics to the wine, the cask being made of a plurality of oak staves each of which has been individually shaped to form a cask or barrel shape having a greater diameter at its center than at its end.

As each of the staves has to be individually shaped, the production of such casks is very labour intensified, and after use of the cask for a period of time, often their effectiveness in imparting flavour is reduced, this requiring the timber to be shaved on the inside of the cask to remove the layer of wood which has been in contact with the wine.

Attempts have been made to overcome this difficulty by various means such as by immersing oak chips within a stainless steel vat, but this has not been readily successful.

It is an object of this invention to provide means whereby the vat is quickly and readily produced, and in which the staves need not be individually shaped, and can be readily reversed if desired.

One attempt to overcome this problem has been described in Pat. No. 535,952 which describes a container for the storage of wine, this having a peripheral frame of metal defining upper, lower and end walls, a pair of timber panel assemblies, one on each side of the peripheral frame, and a pair of clamping frames one on each side to clamp the timber panel assemblies against resilient seals between the frame and the timber panel assemblies, the clamping frames being clamped by clamping means extending between the frames to clamp these into sealing engagement with the peripheral frame.

This container is relatively tall compared to its width and length, with the clamping frames extending completely around the perimeter of the container, this creating difficulties in assembly, and if for instance one of the staves is porous or has some other defect, both peripheral clamping frames have to be released from each other in order to replace a single stave. Also by having a continuous peripheral clamping frame, even though there are various clamping bolts extending between the clamping frames, due to the large size of the container, sealing problems could possibly occur.

It is an object of this invention to provide an improved vat which is of a simple construction, and in which the sealing is more effective.

Thus there is provided according to this invention a vat for the storage of liquids such as wine, said vat comprising an annular metal frame, each side having a peripheral flange, side walls of wooden staves closing the sides of the annular frame, and means clamping the wooden staves one on each side to its respective side flange of the annular metal frame.

In order to more fully describe the invention reference will now be made to the accompanying drawing in which.

Figure 1:
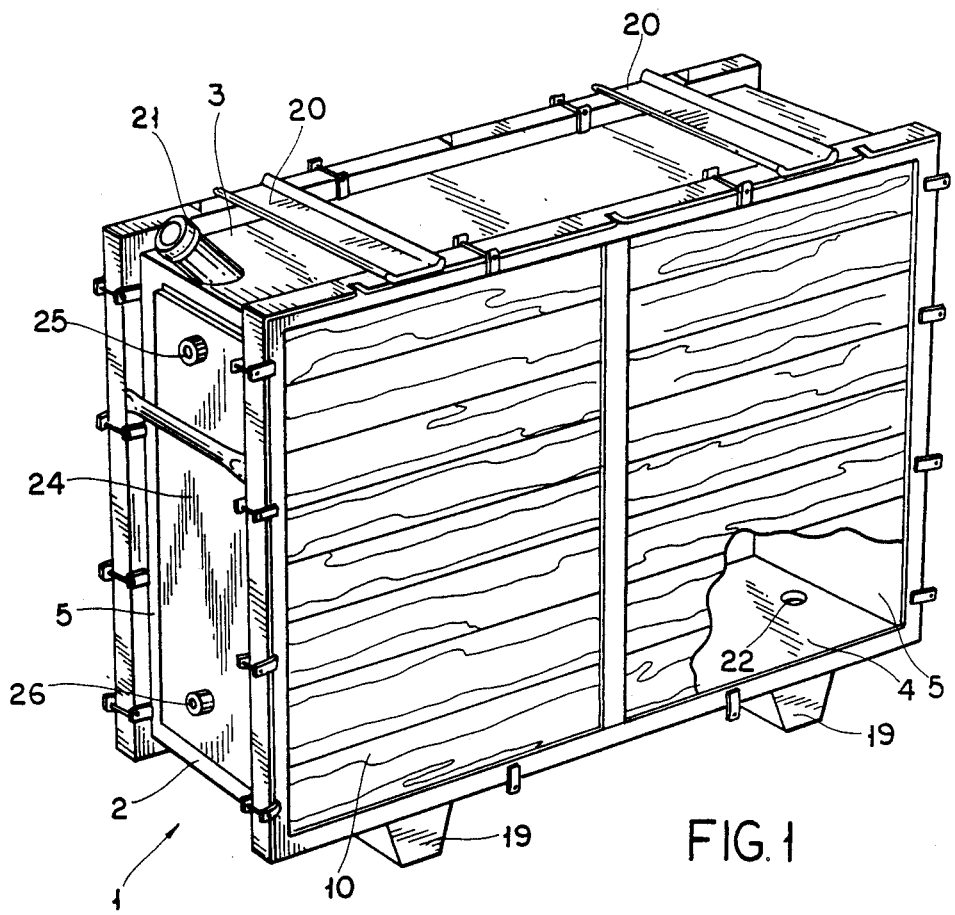
FIG. 1 is a perspective view of the vat.
Figures 2, 3:
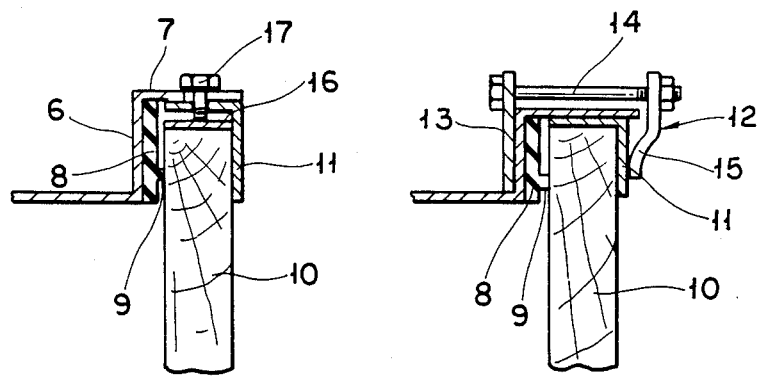
FIG. 2 is a cross-sectional view along the top of one side of the vat.
FIG. 3 is a cross-sectional view along an end of one side of the vat.

As shown in the drawing, the vat 1 has an annular metal frame 2 which has a top 3, bottom 4, and end walls 5, the annular metal frame 2 preferably being formed of stainless steel. The annular frame 2 on its side edges is provided with an outwardly extending flange 6 at right angles to the top, bottom and end walls, and a further flange 7 extending parallel to the top, bottom and end walls.

To the flange 6 there is attached a peripheral sealing member 8 having an outstanding sealing bead 9. This sealing member is a food grade latex rubber seal, the sealing bead providing a seal agaist wooden staves 10.

The staves 10 provide the side walls to the vat, the staves preferably being of oak. Each stave 10 extends along the length of each side of the vat, the staves 10 being in abutting relationship with each other.

The staves are held in an angular frame 11, this preferably being of angle iron, and which fits inside the further flange 7.

In order to clamp and seal the staves against the sealing bead 9, a series of clamps 12 the angular frame against the bead, the clamps acting on the reverse side of the flange 6. Thus each clamp may include a member 13 acting on the flange 6, the members 13 each being affixed as by welding to the flange 6, or it may be merely positioned thereon before tightening the nut of the bolt 14 which carries at its other end a clamping plate 15 to act against the angular frame 11.

In a further embodiment, not shown, the angular frame 11 may have projecting lugs to extend past the flange 7, these lugs being bolted to plates engaging the reverse side of the flange 6.

While the above arrangement will seal the staves against the sealing bead, there is also provided a means of applying pressure vertically to the staves to ensure that the abutting edges of the staves are in sealing relationship.

In order to apply this pressure, a pressure plate 16 in the form of a metal bar is positioned along the top edge of the uppermost stave inside the angular frame 11, and a plurality of screws 17 are threaded through holes in the angular frame 11 so that pressure can be applied to the staves. In this way the staves are assembled in the angular frame 11, the screws tightened, and then the angular frame 11 with the staves therein is assembled to the the annular frame 2. The screws are tightened to prevent leakage and weeping when new, and then the screws are backed off as the staves expand.

The flange 7 is provided with a plurality of slots corresponding in position to the screws, so that the angular frame 11 can be assembled to the annular frame 2.

The staves 10 can abut each other, or be formed with a tongue and groove joint, or be provided therebetween with a small sealing member.

While an angular frame 11 is described, the staves may be individually clamped at each end to thus eliminate the need of a frame. The top and bottom staves could also be clamped along their length to ensure sealing, and the screws 17 could be threaded into the flange 7 to apply the sealing pressure between each stave.

These clamps may comprise a U-shaped member, one arm of the U to engage the wooden stave, and the other arm having clamping means to adjustably clamp the stave to the flange. This adjustable clamp can preferably comprise a cam like member pivoted to the leg of the clamp, with a lever extending therefrom so that as the lever is moved to rotate the cam, the cam progressively engages onto the flange with increasing force to thus apply the desired sealing pressure.

The leg of the clamp engaging the stave can be a flat member, to directly engage the stave, or preferably can include one or more adjustable screws which themselves can directly engage onto the wooden stave, or which can have attached to their ends a plate by a swivel or wall and socket or other type of connection to more uniformly distribute the clamping pressure across the wooden stave. Thus the screws can be adjusted so that when the cam and its lever have moved to the maximum position, the desired pressure is applied so that the clamping lever would then extend generally parallel to and lie against their respective surface of the base frame.

The base frame can be provided at its bottom with legs or stands 19 on which the vat can rest, these preferably being hollow so that they are suitable to take the forks of a forklift truck.

Each vat at its upper end would have rests 20 on the top surface of the base frame these being shaped to receive the stands of a further vat positioned on top so that the vats can be stacked one on top of the other.

At the top of the vat a suitable filler pipe 21 can be provided, and also at the bottom a suitable drain 22 can also be provided.

With this form of the invention it is also advantageous to provide means for chilling or cooling the wine, and for this purpose on one or both ends of the vat a cooling plate can be attached thereto. This can be a stainless steel plate 24 attached and welded around its periphery to the end or ends of the base frame, the stainless steel plate being dimpled or the like to provide strength, and also if desired the dimples can contact the peripheral base frame, suitable inlets 25 and outlets 26 being provided for the passage of a cooling medium therethrough which can be brine or any other cooling medium as desired.

Thus it will be seen that there is provided a vat which can be easily handled and positioned as desired, can be stacked, the wooden staves on one side of the vat can be easily fitted and replaced as desired without disrupting and breaking the seals of adjacent or staves on the other side of the vat, and optionally has efficient means for chilling of the wine. The wooden staves can be easily removed allowing complete access to internal surfaces of the vat for cleaning and sterilizing.

Although one form of the invention has been described in some detail it is to be realized that the invention is not to be limited thereto but can include various modifications falling within the spirit and scope of the invention.

We claim:

1. A vat for the storage of liquids such as wine, said vat comprising:
    an annular metal frame, each side of said metal frame having a peripheral side flange;
    side walls of wooden staves closing said sides of said annular frame;
    means on each of said sides closed by said wooden staves clamping said wooden staves to its respective side flange of said annular metal frame;
    said wooden staves of each said side wall being supported in an angular frame, said clamping means clamping each said angular frame to its respective side flange;
    said staves of each said side being arranged in parallel abutting relationship to each other;
    means for applying pressure to said staves in a direction to maintain said adjacent abutting edges in sealing relationship, said pressure applying means comprising a pressure plate extending along the free edge of the stave closest to a side of said angular frame; and
    pressure adjusting screws bearing against said pressure plate.

2. A vat for the storage of liquids as defined in claim 1, wherein said clamping means are a plurality of spaced clamps extending around each said peripheral flange, said clamps including a member to engage a reverse side of each said peripheral flange, and a further member engaging said side wall, an adjustable bolt connecting said member and said further member.

3. A vat as defined in claim 1, wherein said annular metal frame has a top, a bottom and end walls, a plate welded to one of said end walls in spaced relation therefrom, an inlet to and an outlet from the interior space of said vat, whereby cooling fluid may be circulated through said interior space of said vat.

4. A vat for the storage of liquids as defined in claim 1, wherein said screws are threadably received in apertures in said angular frame.

5. A vat for the storage of liquids as defined in claim 4, wherein said clamping means are a plurality of spaced clamps extending around each said peripheral flange, said clamps including a member to engage a reverse side of each said peripheral flange, and a further member engaging said side wall, an adjustable bolt connecting said member and said further member.

6. A vat as defined in claim 4, wherein said annular metal frame has a top, a bottom and end walls, a plate welded to one of said end walls in spaced relation therefrom, an inlet to and an outlet from the interior space of said vat, whereby cooling fluid may be circulated through said interior space of said vat.

7. A vat for the storage of liquids as defined in claim 1, wherein said screws are threadably received in a further flange extending from said peripheral flange.

8. A vat for the storage of liquids as defined in claim 7, wherein said clamping means are a plurality of spaced clamps extending around each said peripheral flange, said clamps including a member to engage a reverse side of each said peripheral flange, and a further member engaging said side wall, an adjustable bolt connecting said member and said further member.

9. A vat as defined in claim 7, wherein said annular metal frame has a top, a bottom and end walls, a plate welded to one of said end walls in spaced relation therefrom, an inlet to and an outlet from the interior space of said vat, whereby cooling fluid may be circulated through said interior space of said vat.

10. A vat for the storage of liquids as defined in claim 7, including sealing means on each said peripheral flange to engage said staves.

11. A vat for the storage of liquids as defined in claim 10, wherein said sealing means has an outstanding bead to engage said staves.

12. A vat for the storage of liquids as defined in claim 11, wherein said clamping means are a plurality of spaced clamps extending around each said peripheral flange, said clamps including a member to engage a reverse side of each said peripheral flange, and a further member engaging said side wall, an adjustable bolt connecting said member and said further member.

13. A vat for the storage of liquids as defined in claim 10, wherein said clamping means are a plurality of spaced clamps extending around each said peripheral flange, said clamps including a member to engage a reverse side of each said peripheral flange, and a further member engaging said side wall, an adjustable bolt connecting said member and said further member.

14. A vat as defined in claim 10, wherein said annular metal frame has a top, a bottom and end walls, a plate welded to one of said end walls in spaced relation therefrom, an inlet to and an outlet from the interior space of said vat, whereby cooling fluid may be circulated through said interior space of said vat.

15. A vat for the storage of liquids as defined in claim 1 including sealing means on each said peripheral flange to engage said staves.

16. A vat for the storage of liquids as defined in claim 15, wherein said sealing means has an outstanding bead to engage said staves.

17. A vat for the storage of liquids as defined in claim 16, wherein said clamping means are a plurality of spaced clamps extending around each said peripheral flange, said clamps including a member to engage a reverse side of each said peripheral flange, and a further member engaging said side wall, an adjustable bolt connecting said member and said further member.

18. A vat as defined in claim 16, wherein said annular metal frame has a top, a bottom and end walls, a plate welded to one of said end walls in spaced relation therefrom, an inlet to and an outlet from the interior space of said vat, whereby cooling fluid may be circulated through said interior space of said vat.

19. A vat for the storage of liquids as defined in claim 15, wherein said clamping means are a plurality of spaced clamps extending around each said peripheral flange, said clamps including a member to engage a reverse side of each said peripheral flange, and a further member engaging said side wall, an adjustable bolt connecting said member and said further member.

20. A vat for the storage of liquids such as wine, said vat comprising:
   an annular metal frame, each said having a peripheral flange, side walls of wooden staves closing said sides of said annular frame;
   an angular frame supporting said wooden staves of each side wall in parallel abutting relation to each other, clamping means clamping each angular frame to the respective side flange of the annular frame;
   a pressure plate extending along a free edge of the stave closest to the angular frame; and
   pressure adjusting screws bearing against said pressure plate to maintain the adjacent abutting edges of the staves in sealing relationship.

* * * * *